(12) United States Patent
Yoneyama et al.

(10) Patent No.: US 6,219,112 B1
(45) Date of Patent: Apr. 17, 2001

(54) ILLUMINATION OPTICAL SYSTEM AND LIQUID CRYSTAL PROJECTOR APPARATUS USING THE SAME

(75) Inventors: Kazuya Yoneyama; Fumio Watanabe, both of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/197,673

(22) Filed: Nov. 23, 1998

(30) Foreign Application Priority Data

Jan. 29, 1998 (JP) .................................................. 10-032213

(51) Int. Cl.[7] .................................................. G02F 1/1335
(52) U.S. Cl. ..................................... 349/5; 349/8; 349/57; 349/95; 353/20; 353/38; 359/487
(58) Field of Search ............................... 349/5, 8, 57, 95; 353/20, 38; 359/487

(56) References Cited

U.S. PATENT DOCUMENTS

| | | | |
|---|---|---|---|
| 5,384,659 | * | 1/1995 | Shikama et al. ...................... 359/718 |
| 5,570,209 | * | 10/1996 | Usui et al. ................................ 349/5 |
| 5,852,479 | * | 12/1998 | Ueda et al. ............................... 349/9 |
| 5,978,136 | * | 11/1999 | Ogawa et al. ........................ 359/487 |
| 6,109,752 | * | 8/2000 | Itoh et al. ............................... 353/98 |
| 6,123,424 | * | 9/2000 | Hayashi et al. ........................ 353/20 |

FOREIGN PATENT DOCUMENTS

| | | | |
|---|---|---|---|
| 8-304739 | 11/1996 | (JP) | .............................. G02B/27/28 |
| 9-090510 | 4/1997 | (JP) | .............................. G03B/21/14 |

* cited by examiner

*Primary Examiner*—Kenneth Parker
*Assistant Examiner*—Julie Ngo
(74) *Attorney, Agent, or Firm*—Snider & Associates; Ronald R. Snider

(57) ABSTRACT

In an illumination optical system and a liquid crystal projector apparatus using the same, two lens arrays each comprising linear convex lens arrays with their pitches shifted from each other are used for improving image quality such as not to generate shadows of the cementing ridge of a cross dichroic prism, and a polarization-converting optical system is appropriately disposed, so as to obtain uniform illumination effects efficiently. The vertical angle ridge 71 of four prisms constituting the cross dichroic prism 70 is disposed so as to be orthogonal to the optical axis, the polarization-converting optical system 3 is disposed such that a plane including the vertical angle ridge 71 and optical axis and the direction along which stripes of half-wavelength phase films 32 extend are orthogonal to each other, and the direction of shifting the lens columns of a plurality of linear convex lens arrays constituting the first and second lens arrays 21 and 22 is orthogonal to the plane.

9 Claims, 4 Drawing Sheets ated at the center of the cross dichroic prism, the reflection characteristic of the reflecting film may vary; 2) the form-processing precision of each prism is so low that a slight gap may be formed between the cemented surfaces; 3) a level difference may occur between reflecting surfaces to be flatly cemented together at the time of bonding; and so on. When luminous fluxes, from a plurality of directions, pass through the cross dichroic prism having such a problem in precision, near the cementing ridge in particular, the light is eclipsed due to such defects, thus yielding shadows.
ILLUMINATION OPTICAL SYSTEM AND LIQUID CRYSTAL PROJECTOR APPARATUS USING THE SAME

RELATED APPLICATIONS

This application claims the priority of Japanese Patent Application No. 10-32213 filed on Jan. 29, 1998, which is incorporated herein by reference.

BACKGROUND OF THE INVENTION

1. Field of the Invention

The present invention relates to an illumination optical system used in a liquid crystal video projector in which three primary color light components are combined together by a cross dichroic prism so as to project a color image onto a screen, and the liquid crystal video projector using the same. In particular, the present invention relates to an illumination optical system having two lens arrays each comprising a plurality of linear convex lens arrays arranged as being shifted column by column from each other in a predetermined direction, and a polarization-converting optical system comprising a polarizing beam splitter array and a half-wavelength phase having a plurality of half-wavelength phase films arranged like stripes; and a liquid crystal projector apparatus equipped with this illumination optical system.

2. Description of the Prior Art

Known in liquid crystal projector apparatus is an illumination optical system in which an integrator optical system comprising two lens arrays and a polarization-converting optical system are combined together in order to efficiently utilize light from a light source. Such an illumination optical system is disclosed, for example, in Japanese Unexamined Patent Publication No. 8-304739.

The above-mentioned illumination optical system comprises a first lens sheet, constituted by a plurality of condenser lenses each having a rectangular outer shape, for collecting light emitted from the light source, in order to form a plurality of light source images; and a second lens sheet, disposed near the position where the plurality of light source images are formed, comprising a condenser lens array, a polarization-separating prism array, a half-wavelength phase plate, and an exit-side lens.

In this illumination optical system, randomly polarized light radiated from the light source is converged by the first lens sheet onto a predetermined area of the polarization-separating lens array, and then is spatially separated into two kinds of polarized light (P and S polarized light components). Thereafter, each polarized light component is guided to a predetermined area of the half-wavelength phase sheet, so that one kind of polarized light is converted into the other kind of polarized light. As a consequence, the randomly polarized light radiated from the light source can irradiate an illumination area while having been turned into substantially one kind of polarized light. When such an illumination optical system is used in a liquid crystal projector, almost all of the light can be utilized, whereby efficiency in light utilization would improve, thus allowing brighter projection images to be obtained.

Further, in the second lens sheet, the two kinds of polarized light emitted from the polarization-separating prism array are separated from each other in conformity to the laterally long rectangular form of the illumination area. Consequently, light quantity would not be wasted, thus allowing illumination efficiency to improve.

On the other hand, an illumination optical system using a cross dichroic prism as the color-combining means of the projector apparatus and comprising two multi-lens arrays is disclosed, for example, in Japanese Unexamined Patent Publication No. 9-90510.

The cross dichroic prism is formed by four pieces of prisms cemented together by way of thin films having predetermined reflection characteristics, and can be employed as a simple, small-sized color-combining means in a projector apparatus. Due to its precision in manufacture, however, a plurality of shadows may occur in the projected image.

The illumination optical system disclosed in the above-mentioned Japanese Unexamined Patent Publication No. 9-90510 yields a favorable image by preventing these shadows from becoming evident.

Such shadows may occur because: 1) due to unevenness in thin films near the vertical angle ridge perpendicularly located at the center of the cross dichroic prism, the reflection characteristic of the reflecting film may vary; 2) the form-processing precision of each prism is so low that a slight gap may be formed between the cemented surfaces; 3) a level difference may occur between reflecting surfaces to be flatly cemented together at the time of bonding; and so on. When luminous fluxes, from a plurality of directions, pass through the cross dichroic prism having such a problem in precision, near the cementing ridge in particular, the light is eclipsed due to such defects, thus yielding shadows.

In the illumination optical system disclosed in Japanese Unexamined Patent Publication No. 9-90510, the respective convex lenses of the multi-lens arrays are staggered, so that such a plurality of shadows formed in the projected image become unremarkable on the image. Even when there is a defect at the center part of the cross dichroic prism, the density of the shadows appearing on the image is lowered, whereby the image quality is improved and the defect in the cross dichroic prism can be compensated for.

As mentioned above, the illumination optical system such as that disclosed in Japanese Unexamined Patent Publication No. 8-304739 in which an integrator optical system and a polarization-converting optical system are combined together, efficiency in light utilization can be improved, so as to yield a bright projection image. When a cross dichroic prism is used as the color-combining means in a projector apparatus, the problem of shadows mentioned above would similarly occur in the projector apparatus using this illumination optical system as well.

When the respective convex lenses of the lens arrays are staggered as in the case of the illumination optical system disclosed in the above-mentioned Japanese Unexamined Patent Publication No. 9-90510, the shadows can be made thinner, so as to improve the image quality. Nevertheless, since this illumination optical system is not combined with a polarization-converting optical system, bright images may not efficiently be obtained in the liquid crystal projector apparatus.

SUMMARY OF THE INVENTION

In view of such circumstances, it is an object of the present invention to provide an illumination optical system which improves image quality so as not to generate shadows at the cementing ridge of the cross dichroic prism and comprises a polarization-converting optical system, so as to be able to attain uniform illumination effects efficiently; and a liquid crystal projector apparatus using the same.

In a liquid crystal projector apparatus having liquid crystal display panels for respectively luminance-modulating three primary color light components according to video signals corresponding thereto, a cross dichroic prism for color-combining thus modulated primary color light components, and a projection lens for projecting thus combined three primary color light components onto a predetermined screen, the illumination optical system in accordance with the present invention is an illumination optical system for irradiating the liquid crystal display panels, comprising:

a light source section for emitting white light as substantially a parallel luminous flux in a predetermined direction;

an integrator optical system having first and second lens arrays each comprising a plurality of linear convex lens arrays arranged as being shifted column by column from each other in the column direction, in which individual convex lens surfaces of the second lens array correspond to individual convex lens surfaces of the first lens array, and the second lens array is disposed near a plurality of light source images formed by the individual convex lenses of the first lens array;

a polarization-converting optical system comprising a polarizing beam splitter array disposed on the light exit surface side of the second lens array, and a half-wavelength phase plate, disposed on the light exit surface side of the polarizing beam splitter array, having a plurality of half-wavelength phase films arranged like stripes;

wherein a vertical angle ridge of four prisms forming the cross dichroic prism is disposed so as to be orthogonal to an optical axis;

wherein a plane including the vertical angle ridge and optical axis and a direction along which the stripes of the half-wavelength phase films extend are orthogonal to each other; and wherein the direction by which the columns of lenses in the plurality of linear convex lens arrays constituting the first and second lens arrays are shifted is orthogonal to the plane including the vertical angle ridge and optical axis.

The liquid crystal projector apparatus in accordance with the present invention comprises the above-mentioned illumination optical system.

The individual convex lens surfaces of the first lens array and their corresponding individual convex lens surfaces of the second lens array may face each other.

Preferably, each of the convex lenses of the first and second lens arrays has a form similar to an effective aperture of each liquid crystal display panel.

Each of the convex lenses of the first and second lens arrays may have a rectangular form.

Preferably, in the first and second lens arrays, the plurality of linear convex lens arrays are arranged with pitches thereof being shifted column by column from each other in the column direction such that demarcations of the convex lenses in one column do not align with those in neighboring columns thereof.

In the first and second lens arrays, the plurality of linear convex lens arrays may be arranged as being shifted column by column from each other in the column direction by ¼ pitch.

Preferably, substantially the whole quantity of light converged by the individual convex lenses of the second lens array is made incident on individual polarizing beam splitter elements of the polarizing beam splitter array.

Preferably, the polarizing beam splitter array has a form similar to the effective aperture of each liquid crystal display panel.

DESCRIPTION OF THE PREFERRED EMBODIMENTS

In the following, embodiments of the present invention will be explained with reference to the accompanying drawings.

Figure 1:
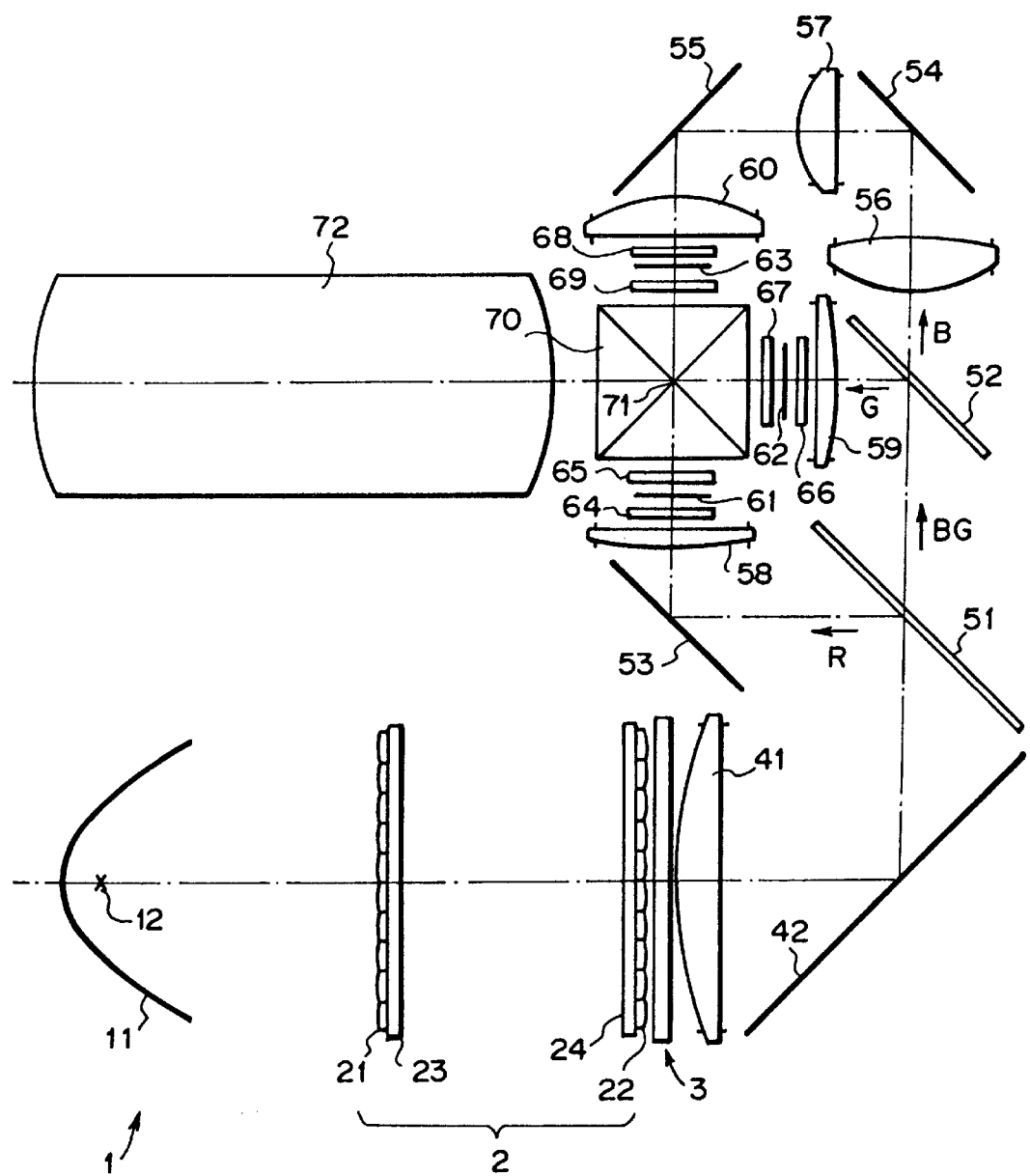
FIG. 1 is a schematic view showing a liquid crystal projector apparatus using an illumination optical system in accordance with an embodiment of the present invention.

FIG. 1 is a schematic view showing a liquid crystal projector apparatus using an illumination optical system in accordance with an embodiment of the present invention. In the illumination optical system and liquid crystal projector apparatus, an integrator optical system 2, a polarization-converting optical system 3, and a cross dichroic prism 70 are arranged with respect to each other with directional relationships such as those shown in FIG. 5. The directional relationships of these members, i.e., the relationships between the direction (arrow A) along which linear convex lens arrays of first and second lens arrays 21 and 22 are shifted, the direction (arrow B) along which the stripes of half-wavelength phase films 32 extend, and the direction (arrow C) along which the vertical angle ridge 71 of four prisms constituting the cross dichroic prism 70 extends will be explained later in detail.

First, the illumination optical system will be explained with reference to FIG. 1.

A light source section 1 comprises a parabolic reflector 11 and a light source lamp 12 disposed at the focal position of the reflector 11. The light source lamp 12 is a high-luminance white light source such as halogen lamp or metal halide lamp. The white light radiated from the light source lamp 12 is reflected by the parabolic reflector 11 into one direction, so as to become a luminous flux substantially in parallel to the optical axis of the parabolic reflector 11 and enter the integrator optical system 2.

Usually, a UV/IR cut filter for cutting ultraviolet and infrared light is disposed on the light-exit side of the light source section 1, whereas a cooling means is provided for cooling the light source section 1 and its vicinity by air-cooling or the like.

The integrator optical system 2 is constituted by the first and second lens arrays 21 and 22. Each of the first and second lens arrays 21 and 22 comprises a plurality of linear convex lens arrays arranged on its substrate 23, 24 as being shifted column by column from each other in their column direction. The individual convex lenses of the first lens array 21 and the individual convex lenses of the second lens array 22 have their corresponding surfaces facing each other. The arrangements of individual convex lenses in both lens arrays will be explained later.

It will be sufficient if the individual lens surfaces of the first lens array 21 correspond to those in the second lens array 22. Namely, it is not always necessary for them to face each other, as in the case where the first lens array 21 and the second lens array 22 have forms similar to each other with their convex lens surfaces corresponding to each other. In order for the luminous flux of the light source to efficiently and uniformly irradiate the effective aperture of each liquid crystal panel, which will be explained later, each convex lens preferably has a form similar thereto, which is rectangular in general.

The light incident on the first lens array 21 forms, due to the condensing effect of each convex lens, light source images on a plane perpendicular to the light axis by the number identical to the number of the convex lenses. The second lens array 22 is disposed near the position where the light source images are located.

The light converged by each convex lens of the second lens array 22 is made incident on the polarization-converting optical system 3 adjacent to the second lens array 22.

Figure 2:
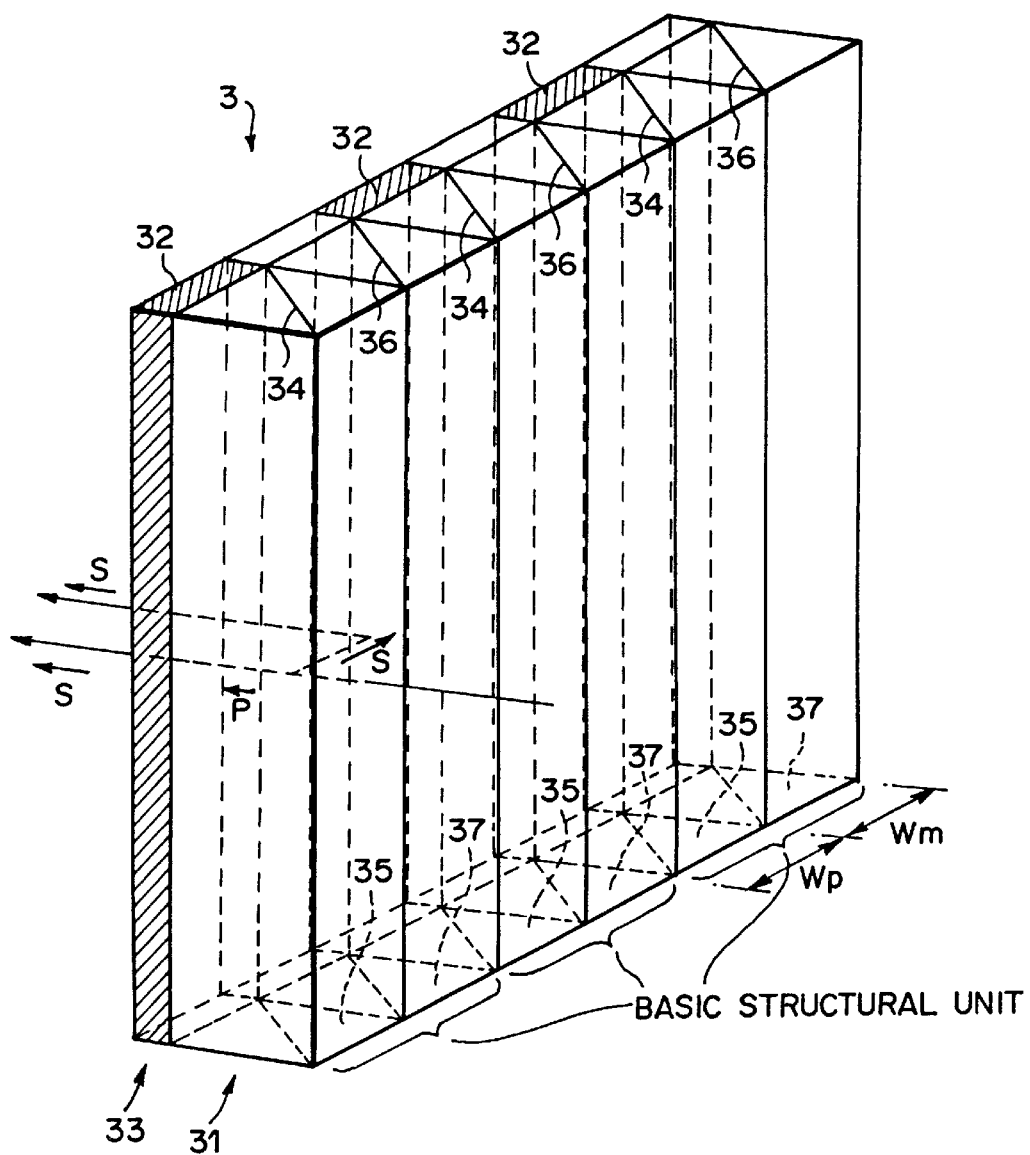
FIG. 2 is a perspective view of the polarization-converting optical system in the liquid crystal projector apparatus shown in FIG. 1.
Figure 3:
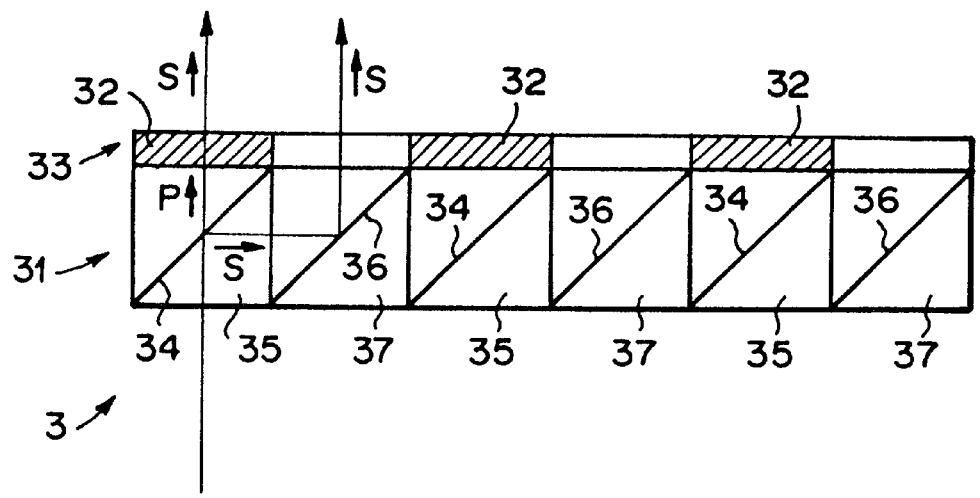
FIG. 3 is a sectional view of the polarization-converting optical system in the liquid crystal projector apparatus shown in FIG. 1.

As shown in FIGS. 2 and 3, the polarization-converting optical system 3 comprises a polarizing beam splitter array 31, and a half-wavelength phase plate 33, disposed on the light exit surface side of the polarizing beam splitter array 31, comprising a plurality of half-wavelength phase films 32 arranged like stripes.

The polarizing beam splitter array 31 comprises, as a basic structural unit, a pair made of a polarizing beam splitter 35 constituted by a quadrangular prism composite having a polarization-separating film 34 formed therein, and a reflecting mirror 37 constituted by a quadrangular prism composite having a reflecting film 36 therein. A plurality of such pairs are arranged within a plane in which the light source images are formed. For example, the polarizing beam splitters 35 and reflecting mirrors 37 are arranged alternately in a direction orthogonal to the optical axis, with the polarization-separating films 34 and reflecting films 36 therein having substantially the same angle of inclination with respect to the optical axis.

The polarizing beam splitter array 31 is regularly arranged such that one pair of basic structural unit corresponds to one column of linear convex lens array constituting the second lens array 22. Also, when the lateral width Wp of one polarizing beam splitter 35 and the lateral width Wm of one reflecting mirror 37 are made equal to each other as shown in FIG. 2, the apparatus can be made compact.

The light source light, which is randomly polarized light incident on the polarizing beam splitter array 31, is separated by the polarizing beam splitter 35 into two kinds of polarized light, i.e., P-polarized light and S-polarized light, having directions of polarization different from each other. For example, as shown in FIGS. 2 and 3, the P-polarized light passes through the polarizing beam splitter 35 as it is without changing the advancing direction thereof. On the other hand, the S-polarized light is reflected by the polarization-separating film 34 of the polarizing beam splitter 35 so as to change its advancing direction by about 90 degrees, and then is reflected by the reflecting film 36 of the adjacent reflecting mirror 37 so as to change the advancing direction by about 90 degrees, before being finally emitted out of the polarizing beam splitter array 31 with an angle substantially in parallel to the P-polarized light.

In order to fully attain such effects of the polarizing beam splitter array 31, it is necessary that the light converged by each convex lens of the second lens array 22 be made incident on its corresponding polarizing beam splitter 35 of the polarizing beam splitter array 31.

Placed on the light exit surface side of the polarizing beam splitter array 31 is the half-wavelength phase plate 33 in which the half-wavelength films 32 are regularly arranged. For example, in FIGS. 2 and 3, the half-wavelength phase films 32 are disposed only at the light exit surface portions of the polarizing beam splitters 35 constituting the polarizing beam splitter array 31, whereas no half-wavelength phase films 32 are disposed at the light exit surface portions of the reflecting mirrors 37. Namely, according to the fact that the polarizing beam splitters 35 and reflecting mirrors 37 of the polarizing beam splitter array 31 are disposed alternately, the half-wavelength phase films 32 are arranged like stripes in the half-wavelength phase plate 33.

The P-polarized light emitted from the polarizing beam splitter 35 is converted to S-polarized light due to the rotating action of the plane of polarization when passing through the half-wavelength phase film 32. On the other hand, the S-polarized light emitted from the reflecting mirror 37 passes through the half-wavelength phase plate 33 as the S-polarized light since it does not pass through the half-wavelength phase film 32. Thus, by way of the polarizing beam splitter array 31 and the half-wavelength phase plate 33, the randomly polarized light is spatially separated into two kinds of polarized light having directions of polarization different from each other, which are converted into one kind of polarized light (S-polarized light in this case) when passing through the half-wavelength phase plate 33, so as to be guided to an illumination area. Since different polarized light components are thus converted into a single kind of polarized light, so that substantially the whole light source light reaches the illumination area, the latter is substantially uniformly illuminated with polarized light whose direction of vibration is substantially uniform. In order for the luminous flux of the light source to efficiently and uniformly irradiate the effective aperture of each liquid crystal display panel explained later, the polarizing beam splitter 31 and the half-wavelength phase plate 33 preferably have a form similar thereto.

In the liquid crystal projector apparatus equipped with such an illumination optical system, as shown in FIG. 1, the luminous flux transmitted through the polarization-converting optical system 3 is guided by an exit-side lens 41 to the illumination area. First, the luminous flux is reflected by a first total reflection mirror 42, so as to be guided to a first dichroic mirror 51. The first dichroic mirror 51 comprises a glass substrate and a dichroic film made of a dielectric multilayer film, formed thereon, having a spectral characteristic as a red light reflecting mirror, while being set such as to yield an incident angle of 45 degrees with respect to the rest of primary color light components. Therefore, it perpendicularly reflects the red light R, while transmitting therethrough the rest of primary color light components.

The red light R reflected by the first dichroic mirror 51 is guided by a second total reflection mirror 53 toward a first liquid crystal display panel 61 by way of a first condenser lens 58.

On the other hand, the rest of primary color light components transmitted through the first dichroic mirror 51 is separated by a second dichroic mirror 52 into green light G and blue light B.

The second dichroic mirror 52 comprises a glass substrate and a dichroic film made of a dielectric multilayer film, formed thereon, having a spectral characteristic as a green light reflecting mirror, while being set such as to yield an incident angle of 45 degrees with respect to the rest of primary color light components. Therefore, it perpendicularly reflects the green light G, while transmitting therethrough the blue light B.

The green light G reflected by the second dichroic mirror 52 is guided toward a second liquid crystal display panel 62 by way of a second condenser lens 59. On the other hand, the blue light B transmitted through the second dichroic mirror 52 is perpendicularly reflected by a third total reflection mirror 54 by way of a relay lens 56, and is guided toward a third liquid crystal display panel 63 by way of an image-inverting relay lens 57, a fourth total reflection mirror 55, and a third condenser lens 60.

Here, each of the three liquid crystal display panels 61, 62, and 63 is made of a twisted nematic (TN) liquid crystal display device and, in response to a corresponding video signal from an unshown liquid crystal driver, displays an image and luminance-modulates each primary color light component.

The primary color light components R, G, and B luminance-modulated in their corresponding liquid crystal display panels 61, 62, and 63 according to their corresponding video signals are then combined into a single white light beam at the cross dichroic prism 70. Here, entrance-side polarizing plates 64, 66, 68, and analyzers 65, 67, 69 are disposed on the entrance side and exit side of the liquid crystal display panels 61, 62, 63, respectively.

The cross dichroic prism 70 is constituted by four rectangular prisms cemented together, with their two orthogonal cementing surfaces respectively coated with dichroic films made of dielectric multilayer films having spectral characteristics as red and blue light reflecting mirrors, whereby three primary color light components of red, blue, and green can be combined into a single luminous flux of white light.

The single white light beam composed in the cross dichroic prism 70 is projected onto a predetermined screen as being enlarged by a projection lens 72. As a consequence, the respective images displayed on the liquid crystal display panels 61, 62, and 63 are projected onto the screen as a full-color image.

The arrangements of a plurality of linear convex lens arrays constituting the first and second lens arrays 21 and 22 will now be explained.

Figure 4:
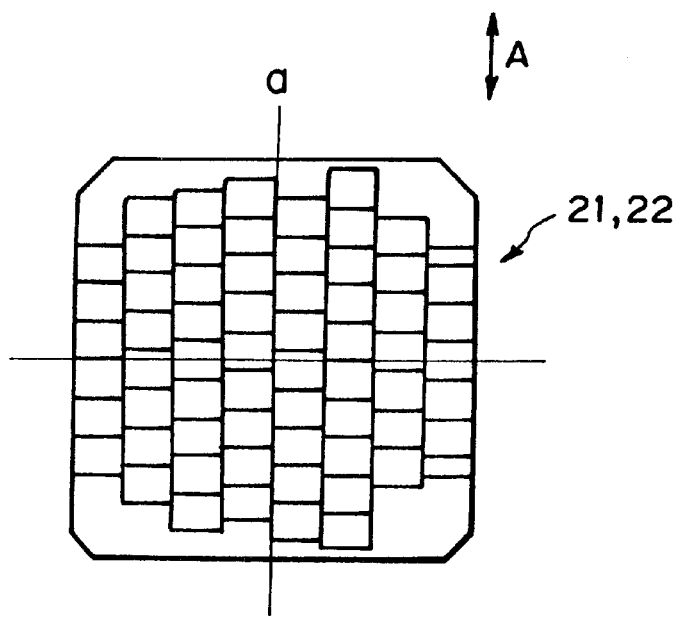
FIG. 4 is a view for explaining an arrangement of linear convex lens arrays in the first lens array in the liquid crystal projector apparatus shown in FIG. 1.

FIG. 4 is a view of the arrangement of linear convex lens arrays in the first lens array 21 as observed from the light source side. Since the individual convex lenses of the first lens array 21 and the second lens array 22 have their corresponding surfaces facing each other, the linear convex lens arrays in the second lens array 22 have substantially a similar arrangement when observed from the light source side.

In the first lens array 21, as shown in FIG. 4, a plurality of linear convex lens arrays extending in the vertical direction on FIG. 4 are arranged as being regularly shifted column by column from each other in their column direction. Namely, in this example, the individual columns of linear convex lens arrays (hereinafter referred to as individual convex lens columns) shift in the direction of arrow A, with such a regularity that they shift column by column by ¼ pitch in the direction of arrow A, so as to be laterally symmetrical to each other with respect to the center axis a. In the case where the individual convex lens columns are thus arranged as being shifted, even when the cross dichroic prism 70, as the color-combining means, has a defect near the cementing ridge thereof, the shadows generated on the projected image due to the defect is dispersed, so as not to be evident in the image as a whole. Therefore, the pitches in the shifting of individual convex lens columns are not restricted, as long as demarcations of the convex lenses in one column do not align with those in neighboring columns thereof.

Figure 5:
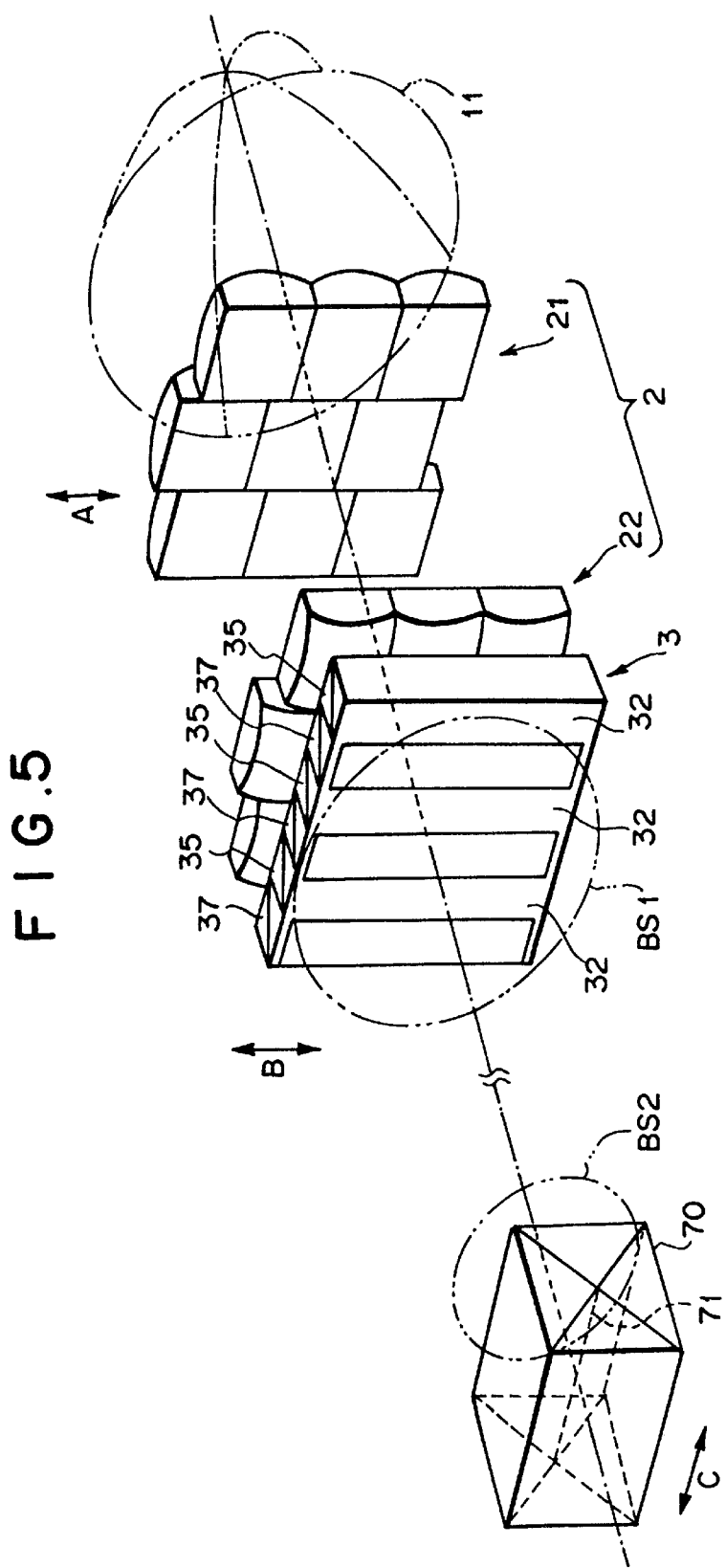
FIG. 5 is a view showing the directional relationships between the direction of shifting the individual lens columns in the first and second lens arrays and the disposing directions of the polarization-converting optical system and the cross dichroic prism in the liquid crystal projector apparatus shown in FIG. 1.

It is necessary, however, to define the direction of shifting the individual lens columns with respect to the polarization-converting optical system 3, i.e., the polarizing beam splitter array 31 and the half-wavelength phase plate 33, and the cross dichroic prism 70. FIG. 5 shows the relationships of their disposed directions.

As shown in FIG. 5, the direction (arrow A) of shifting the convex lens arrays in the first and second lens arrays 21 and 22 and the direction (arrow B) along which the stripes of the half-wavelength phase films 32 of the half-wavelength phase plate 33 (see FIGS. 2 and 3) disposed on the light exit surface side of the polarizing beam splitter array 31 (see the same drawings) extend are both orthogonal to the optical axis and are in parallel to each other.

In such directional relationships, even when the plurality of convex lens columns constituting the first and second lens arrays 21 and 22 are shifted column by column from each other, the light can be made incident on the polarizing beam splitter 31 without wasting the quantity thereof.

Here, the direction (arrow B) along which the stripes of the half-wavelength films 32 extend can be related to the direction along which the polarizing beam splitters 35 and reflecting mirrors 37 constituting the polarizing beam splitter array 31 are arranged. It is due to such a stripe arrangement of the half-wavelength phase plate 32 in which the half-wavelength phase films 32 are disposed only at the light exit surface portions of the polarizing beam splitters 35 constituting the polarizing beam splitter array 31, whereas no half-wavelength phase films 32 are disposed at the light exit surface portions of the reflecting mirrors 37.

As shown in FIG. 5, a basic structural unit pair made of the polarizing beam splitter 35 and reflecting mirror 37 is regularly disposed so as to correspond to each convex lens column linearly extending in the direction of arrow A, whereas the direction (arrow A) of shifting the convex lens column and the direction (arrow B) along which the stripes of the half-wavelength phase films 32 extend are in parallel to each other. Consequently, the light emitted from one column of linear convex lens array is made incident on one column of polarizing beam splitter 35, so as to be separated into two kinds of polarized light, i.e., P-polarized light and S-polarized light, having directions of polarization different from each other, which are finally, in the state turned into one kind of polarized light in conformity to the regular arrangement of the half-wavelength phase films 32, emitted from the polarization-converting optical system 3 substantially in parallel to each other at an angle in parallel to the optical axis.

If the positional relationships between the direction (arrow A) of shifting the individual convex lens columns in the first and second lens arrays 21 and 22, the polarizing beam splitter array 31 (see FIGS. 2 and 3), and the half-wavelength phase plate 33 (see the same drawings) are out of balance, there will inevitably be a loss in quantity of light. For example, if the individual convex lens columns of the first and second lens arrays 21 and 22 are shifted in a direction perpendicular to the direction of arrow A (horizontally on FIG. 5) with respect to the polarizing beam splitter array 31 and half-wavelength phase plate 33 arranged in a direction similar to this embodiment, it will become difficult for the whole quantity of light emitted from the second lens array 22 to be made incident on the polarizing beam splitter 35, whereby it cannot be turned into one kind of polarized light by the half-wavelength phase plate 33.

Though not shown in FIG. 5, the luminous flux transmitted through the polarization-converting optical system 3 as mentioned above is separated into three primary color light components, which are then luminance-modulated at their corresponding liquid crystal display panels. Thereafter, they are combined into a single white light beam at the depicted cross dichroic prism 70. FIG. 5 also shows the luminous flux diameter BS1 emitted from the half-wavelength phase plate 33 and the luminous flux diameter BS2 incident on the cross dichroic prism 70.

The disposing direction of the cross dichroic prism 70 is such that the vertical angle ridge 71 of the four prisms constituting the cross dichroic prism 70 is orthogonal to the optical axis. The direction along which the vertical angle ridge 71 extends is indicated by arrow C. Namely, the direction (arrow C) of the vertical angle ridge 71 is orthogonal not only to the optical axis but also to both of the direction (arrow A) of shifting the individual convex lens columns of the first and second lens arrays 21 and 22 and the direction (arrow B) along which the stripes of the half-wavelength phase films 32 extend.

When the disposing directions of the individual members indicated by arrows A, B, and C are thus defined, the luminous flux emitted from the half-wavelength phase plate 33 is made incident on the cross dichroic prism 70 with a specific angle corresponding to the shift in pitches of the individual convex lens column. As a consequence, even if there is a defect near the cementing ridge of the cross dichroic prism 70, the shadows appearing on the image as the light passes through this portion are dispersed and thinned, whereby the image quality can be improved, and the tolerance for precision in manufacture of the cross dichroic prism can be improved.

As explained in the foregoing, in the illumination optical system in accordance with the present invention and the liquid crystal projector apparatus using the same, the lens array of the integrator optical system is constituted by a plurality of columns of linear convex lens arrays arranged with their pitches shifted from each other, whereby the image quality is improved so as not to generate shadows of the cementing ridge of the cross dichroic prism, and the polarization-converting optical system comprising the polarizing beam splitter array and the half-wavelength phase plate is appropriately disposed, whereby uniform illumination effects can be obtained efficiently.

What is claimed is:

1. In a liquid crystal projector apparatus having liquid crystal display panels for respectively luminance-modulating three primary color light components according to video signals corresponding thereto, a cross dichroic prism for color-combining thus modulated primary color light components, and a projection lens for projecting thus combined three primary color light components onto a predetermined screen; an illumination optical system for irradiating said liquid crystal display panels, said illumination optical system comprising:

a light source section for emitting white light as substantially a parallel luminous flux in a predetermined direction;

an integrator optical system having first and second lens arrays each comprising a plurality of linear convex lens arrays arranged as being shifted column by column from each other in the column direction, in which individual convex lens surfaces of said second lens array correspond to individual convex lens surfaces of said first lens array, and said second lens array is disposed near a plurality of light source images formed by the individual convex lenses of said first lens array;

a polarization-converting optical system comprising a polarizing beam splitter array disposed on the light exit surface side of said second lens array, and a half-wavelength phase plate, disposed on the light exit surface side of said polarizing beam splitter array, having a plurality of half-wavelength phase films arranged like stripes;

wherein a vertical angle ridge of four prisms forming said cross dichroic prism is disposed so as to be orthogonal to an optical axis;

wherein a plane including said vertical angle ridge and optical axis and a direction along which the stripes of said half-wavelength phase films extend are orthogonal to each other; and wherein the direction by which the columns of lenses in said plurality of linear convex lens arrays constituting said first and second lens arrays are shifted is orthogonal to the plane including said vertical angle ridge and optical axis.

2. An illumination optical system according to claim 1, wherein individual convex lens surfaces of said first lens array and their corresponding individual convex lens surfaces of said second lens array face each other.

3. An illumination optical system according to claim 1, wherein each of the convex lenses of said first and second lens arrays has a form similar to an effective aperture of each liquid crystal display panel.

4. An illumination optical system according to claim 1, wherein each of the convex lenses of said first and second lens arrays has a rectangular form.

5. An illumination optical system according to claim 1, wherein, in said first and second lens arrays, said plurality of linear convex lens arrays are arranged with pitches thereof being shifted column by column from each other in said column direction such that demarcations of the convex lenses in one column do not align with those in neighboring columns thereof.

6. An illumination optical system according to claim 1, wherein, in said first and second lens arrays, said plurality of linear convex lens arrays are arranged as being shifted column by column from each other in said column direction by ¼ pitch.

7. An illumination optical system according to claim 1, wherein substantially the whole quantity of light converged by the individual convex lenses of said second lens array is made incident on individual polarizing beam splitter elements of said polarizing beam splitter array.

8. An illumination optical system according to claim 1, wherein said polarizing beam splitter array has a form similar to an effective aperture of each liquid crystal display panel.

9. A liquid crystal projector apparatus comprising the illumination optical system according to claim 1.

* * * * *